US008830028B2

(12) United States Patent
Kang et al.

(10) Patent No.: US 8,830,028 B2
(45) Date of Patent: Sep. 9, 2014

(54) AUTOMATIC TELLER MACHINE CAPABLE OF PERFORMING REMOTE CONTROLLING FUNCTION AND OPENING AND CLOSING OPERATION METHOD OF AUTOMATIC TELLER MACHINE USING SAME

(75) Inventors: Hyun Kook Kang, Gwangju-si (KR); Myung Hwan Ko, Anyang-si (KR)

(73) Assignee: Nautilus Hyosung Inc., Seoul (KR)

( * ) Notice: Subject to any disclaimer, the term of this patent is extended or adjusted under 35 U.S.C. 154(b) by 422 days.

(21) Appl. No.: 13/392,436

(22) PCT Filed: Apr. 23, 2010

(86) PCT No.: PCT/KR2010/002571

§ 371 (c)(1),
(2), (4) Date: Mar. 30, 2012

(87) PCT Pub. No.: WO2011/025122

PCT Pub. Date: Mar. 3, 2011

(65) Prior Publication Data

US 2012/0194319 A1 Aug. 2, 2012

(30) Foreign Application Priority Data

Aug. 24, 2009 (KR) ........................ 10-2009-0078232

(51) Int. Cl.
*G06F 7/04* (2006.01)
*G07F 19/00* (2006.01)

(52) U.S. Cl.
CPC ............ *G07F 19/201* (2013.01); *G07F 19/206* (2013.01); *G07F 19/20* (2013.01)
USPC ........................................................ 340/5.52

(58) Field of Classification Search
USPC ........ 340/4.1, 4.31, 4.61, 5.1, 5.5, 5.52, 5.61, 340/5.64, 12.5
See application file for complete search history.

(56) References Cited

U.S. PATENT DOCUMENTS 8,290,436 B2 * 10/2012 Forrest ......................... 455/41.2
2002/0059387 A1 * 5/2002 Wolfe ........................... 709/206
2006/0237427 A1 * 10/2006 Logan ........................... 219/401

FOREIGN PATENT DOCUMENTS

JP 06-096330 A 4/1994
JP 2633267 B2 7/1997

(Continued)

OTHER PUBLICATIONS

PCT International Search Report, PCT/KR2010/002571, Dec. 6, 2010, 2 Pages.

*Primary Examiner* — Jennifer Mehmood
*Assistant Examiner* — Yong Hang Jiang
(74) *Attorney, Agent, or Firm* — Fenwick & West LLP

(57) ABSTRACT

The present invention relates to an automatic teller machine (ATM) capable of control with a remote controller and an opening and closing operation method of the automatic teller machine using the same. In addition, the invention provides an automatic teller machine capable of performing a remote control function and an opening and closing operation method of the automatic teller machine using the same, which can enable the user to easily control power on/off, module reset, and rebooting operations of the automatic teller machine with a remote controller, thereby quickly and simply carrying out the opening and closing operations of the automatic teller machine, which were complicated and took a lot of time in the past, and easily performing some processes for maintaining the automatic teller machine. Further, the invention provides an automatic teller machine capable of performing a remote control function, comprising: a plurality of buttons and an automatic teller machine body equipped with a short-range wireless receiving device; and a remote controller which can execute the short-range wireless communication with the automatic teller machine body, wherein a system controlling program stored in the automatic teller machine body is activated through the remote controller in such a manner that the opening and closing operations of the automatic teller machine are conducted automatically through the button operation of the remote controller.

12 Claims, 3 Drawing Sheets

(56) References Cited

FOREIGN PATENT DOCUMENTS

| | | | |
|---|---|---|---|
| KR | 2004-0084380 | A | 10/2004 |
| KR | 10-2006-0028313 | A | 3/2006 |
| KR | 10-0607563 | B1 | 7/2006 |
| KR | 10-2007-0103263 | A | 10/2007 |

* cited by examiner

AUTOMATIC TELLER MACHINE CAPABLE OF PERFORMING REMOTE CONTROLLING FUNCTION AND OPENING AND CLOSING OPERATION METHOD OF AUTOMATIC TELLER MACHINE USING SAME

TECHNICAL FIELD

The present invention relates to an automated teller machine (ATM) controlled by a remote controller and an opening/closing operation method of an ATM using the remote controller. More particularly, the present invention relates to an ATM controlled by a remote controller and an opening/closing operation method of an ATM using the remote controller, in which a user easily controls power on/off, module reset, reboot, and the like through the remote controller, so that it is possible to quickly and simply perform the opening and closing operation of the ATM, which were complicated and took much time, and to easily perform some processes for maintenance of the ATM.

BACKGROUND ART

An ATM is an automated apparatus which can assist basic financial services such as deposit or withdrawal without any bank clerk regardless of time and place in relation to financial services. The ATM is configured so that a customer can directly perform financial transactions such as deposit and withdrawal with a medium such as a card or a bankbook.

Conventionally, such ATMs were frequently installed in banking facilities. However, as places of businesses are variously increased and banking hours are prolonged for convenience of customers, the installation places of ATMs have recently been extended, including convenient facilities such as unmanned stores or convenience stores, public places such as subway stations or railway stations, and the like. Also, as the usage pattern of ATMs is extended, the ATMs have not only basic functions such cash deposit/withdrawal and account updating but also various functions such as tax reception and coupon or lottery issue. Also, as the size of ATMs becomes small, the ATMs can be installed at various places.

In addition, opening and closing hours of ATMs are frequently specified so that the ATMs operate for only certain hours for the purpose of management and security maintenance. Accordingly, the opening and closing operation of the ATMs should be performed.

An opening/closing operation process of the conventional ATM will be described. In order to perform the opening operation of the ATM, a person in charge of the ATM first opens a door unit provided in the front or rear of the ATM using a safe key and turns on the ATM through the operation of a power button positioned inside of the ATM. Then, the person installs a cash cassette in a withdrawal module and closes the door unit using the safe key again.

Subsequently, the person presses an Enter key, a Clear key, a Cancel key and button keys "1, 2 and 3" and then inputs a password and the Enter key, using a key input unit. If the password is correctly inputted and service items are displayed on a screen, the person selects an item "Replenish" and then inputs the Enter key. Subsequently, the person selects items "Add Cash" and "Add Cassette1."

Next, the person inputs the number of bills accommodated in the cash cassette and then confirms whether or not the statement of a portfolio, in which the inputted result is outputted, is correct. If the statement of the portfolio is correct, the person presses the Confirm button. The person waits while the ATM stores the inputted statement. Then, if "Successful" is displayed on the screen, the person presses the Cancel button twice, selects an item "In Service" and then presses the Enter key, thereby finishing the opening operation of the ATM.

In order to perform the closing operation of the ATM, the person presses the Enter key, the Clear key, the Cancel key and the button keys "1, 2 and 3" and then inputs the password and the Enter key, using the key input unit. If the password is correctly inputted and the service items are displayed on the screen, the person selects the item "Replenish" and then inputs the Enter key. Subsequently, the person selects items "Total" and "Day Total."

Subsequently, the person receives a portfolio outputted from the ATM, and receives a portfolio outputted from the ATM by selecting an item "Cassette Total." Then, the person presses the Cancel button twice. Next, the person selects the item "In service" and presses the Enter key. Then, the person opens the door unit using the safe key and removes the cash cassette having the withdrawal module installed therein. Finally, the person turns off the ATM through the operation of the power button.

As such, the opening/closing operation process of the ATM is very complicated, and the person should input the corresponding buttons of the key input unit while waiting in front of the ATM throughout the process. While the opening/closing operation of an ATM installed in a banking facility are performed by a person who is a specialist of the ATM, the opening/closing operation of an ATM installed in a customer convenience facility such as a convenience store should be performed by a convenience store owner, and the operation process is very complicated and difficult to a person who is a non-specialist. Hence, inconvenience is caused to customers using the ATM due to frequent errors generated in the opening/closing operation of the ATM.

A failure caused in the ATM may be solved in the outside thereof without opening the door unit of the ATM or may be solved by simply performing reboot, according to the type of the failure. In this case, it is inconvenient that the person opens the door unit and operates the power button, and the person should always go to the installation place of the ATM to recover the ATM from the failure. Therefore, much time and cost is wasted in solving the failure.

DESCRIPTION OF THE INVENTION

Technical Problem

The present invention is conceived to solve the aforementioned problems in the prior art. An object of the present invention is to provide an ATM controlled by a remote controller and an opening/closing operation method of an ATM using the remote controller, in which a user easily controls power on/off, module reset, reboot, and the like through the remote controller, so that it is possible to quickly and simply perform the opening and closing operation of the ATM, which were complicated and took much time, and to easily perform some processes for maintenance of the ATM.

Technical Solution

According to an aspect of the present invention, there is provided an ATM controlled by a remote controller, comprising: an ATM main body having a local area wireless reception device mounted therein; and a remote controller having a plurality of buttons provided therein to perform local area wireless communication with the ATM main body, wherein opening/closing operation of the ATM is automatically performed through button operation of the remote controller by executing a system control program stored in the ATM main body through the remote controller.

According to another aspect of the present invention, there is provided an opening operation method of an ATM controlled by a remote controller, the method comprising the steps of: transmitting, by a user, an opening operation command to the ATM through the remote controller; turning on, by a control unit of the ATM, the ATM main body according to the received opening operation command, and requesting a user of authentication information; receiving authentication information transmitted through the remote controller; performing user authentication for the received authentication information; automatically opening a door unit to request the user to load a cash cassette when the user authentication is normally performed; requesting the user to input the number of bills in the loaded cash cassette if the cash cassette is loaded; closing the door unit if the number of bills is inputted; and storing the input information in a storage unit and outputting a portfolio.

According to a further aspect of the present invention, there is provided a closing operation method of an ATM controlled by a remote controller, the method comprising the steps of: transmitting, by a user, a closing operation command to the ATM through the remote controller; requesting the user of authentication information according to the received closing operation command; receiving the authentication information transmitted through the remote controller; performing user authentication for the received authentication information; automatically opening a door unit to request the user to unload a cash cassette when the user authentication is normally performed; closing the door unit if the cash cassette is unloaded; and terminating the ATM main body by turning off the power of the ATM.

Advantageous Effects

In an ATM controlled by a remote controller and an opening/closing operation method of an ATM using the remote controller according to the present invention, the opening and closing operation of the conventional ATM, which have been complicated and difficult, can be quickly and simply performed. Since some processes for maintenance of the ATM can be easily performed without opening the door unit, the time taken to recover the ATM from a failure can be considerably decreased.

Further, a person in charge of the ATM does not go to the place at which the ATM is installed, but a store owner or manager simply performs failure correction, so that inconvenience of customers can be minimized by decreasing the time left in a customer waiting mode as a temporary stop state.

Figure 1:
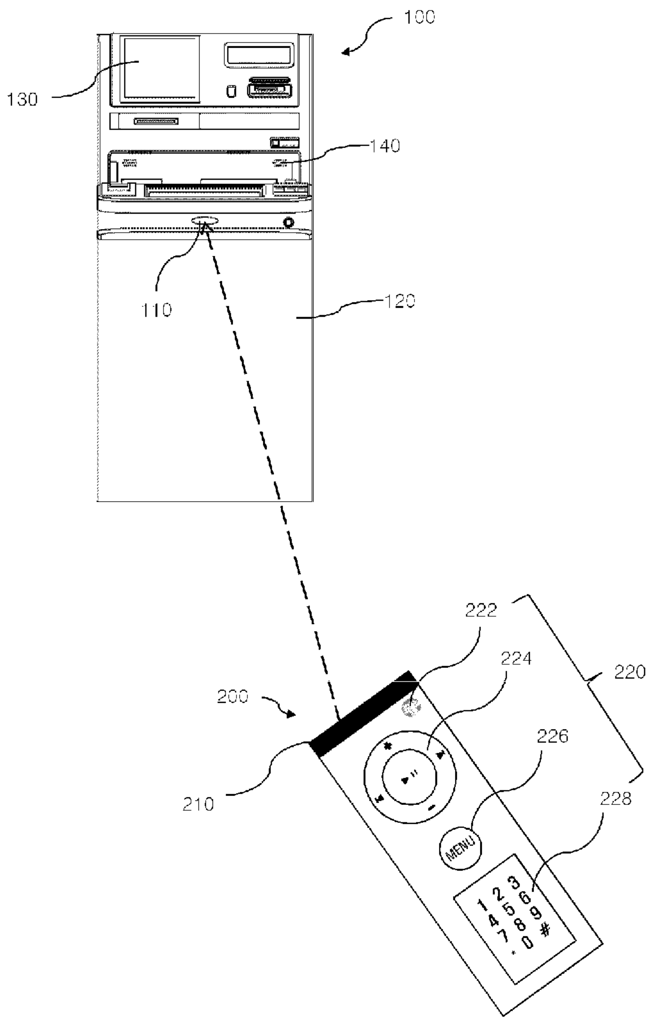
FIG. 1 is a front view showing an external appearance of an ATM controlled by a remote controller according to an embodiment of the present invention.

[Explanation of Reference Numerals for Major Portions Shown in Drawings]

| | |
|---|---|
| 110: Local Area Wireless Reception Device | 120: Door Unit |
| 130: Display Unit | 140: Speaker |
| 210: Wireless Transmission Unit | 220: Button Operation Unit |
| 222: Opening/Closing Operation Unit | 224: Direction Operation Unit |
| 226: Menu Operation Unit | 228: Number Operation Unit |
| 310: Wireless Reception Unit | 312: Display Unit |
| 314: Voice Output Unit | 316: Storage Unit |
| 318: Printing Unit | 320: Communication Unit |
| 322: Control Unit | |

BEST MODE

Hereinafter, preferred embodiments of the present invention will be described in detail with reference to the accompanying drawings.

FIG. 1 is a front view showing an external appearance of an ATM controlled by a remote controller according to an embodiment of the present invention.

As shown in FIG. 1, the ATM according to this embodiment includes an ATM main body 100 having a local area wireless reception device 110 mounted therein and a remote controller 200 capable of performing local area wireless communication. The ATM main body 100 can perform various services of receiving a signal from the remote controller 200 through the local area wireless reception device 110 so as to turns on/off the ATM without opening/closing a door unit 120, automatically performing the opening and closing operation, and performing simple failure correction and update operation.

Here, the local area wireless communication between the remote controller and the ATM main body may be performed using various local area wireless communication methods such as Zig-Bee, infrared communication, Bluetooth and radio frequency (RF).

The ATM main body 100 according to this embodiment include a display 130 for displaying a service executing process on a screen, speakers 140 provided at both lower end sides of the display unit 130 to guide the service executing process, the local area wireless reception device 110 for receiving a signal from the remote controller 200 so as to process the received signal, and the door unit 120 opened/closed so that a cash cassette are loaded/unloaded into/from the ATM main body 100 therethrough. The local area wireless reception device 110 is provided at the center of the front of the ATM main body 100, and the door unit 120 is provided at a lower part of the front of the ATM main body 100. Although it has been illustrated in this embodiment that the local area wireless reception device 110 is provided at the center of the front of the ATM main body 100, the present invention is not limited thereto. That is, it will be apparent that the local area wireless reception device 110 may be provided at all places around the ATM main body 100 as long as it easily receives the signal from the remote controller 200.

The remote controller 200 includes a wireless transmission unit 210, a button operation unit 220 and a central processing unit (not shown). The wireless transmission unit 210 performs local area wireless communication with the ATM main body 100. The button operation unit 220 has a plurality of buttons so as to convert user's input information into an electrical signal. The central processing unit transmits the user's input information through the button operation unit 220 to the ATM main body 100 through the wireless transmission unit 210.

Here, the button operation unit 220 may have a button(s) for each function so as to enable the user to quickly and simply select a service. For example, the button operation unit 220 may include an opening/closing operation unit 222 for automatically performing the opening and closing operation of the ATM, a menu operation unit 226 for entering into a system operation mode by displaying a system control menu screen in display unit 130, a direction operation unit 224 for selecting a menu, and a number operation unit 228 for inputting a number key such as a password. When the user presses a specific button of the button operation unit 220 for a certain period of time, the remote controller 200 according to this embodiment may perform an emergency call function of automatically calling a specified number through the ATM main body 100 so that an emergency situation can be quickly informed to the outside.

In addition, the remote controller 200 may use only a method of inputting a password for the purpose of security in the operation of the ATM. However, the remote controller 200 may perform user authentication by additionally having a biological information recognition unit (not shown) for recognizing user's biological information such as a user's fingerprint, and accordingly, restrict the operation of the remote controller 200, so that the security in the operation of the ATM can be further reinforced.

When a plurality of ATMs are installed, a single remote controller 200 may control the plurality of ATM main bodies 100 in such a manner that an ID number is provided to each ATM main body 100 and the ID number of ATM main body 100 is inputted when the control of the remote controller 200.

Figure 2:
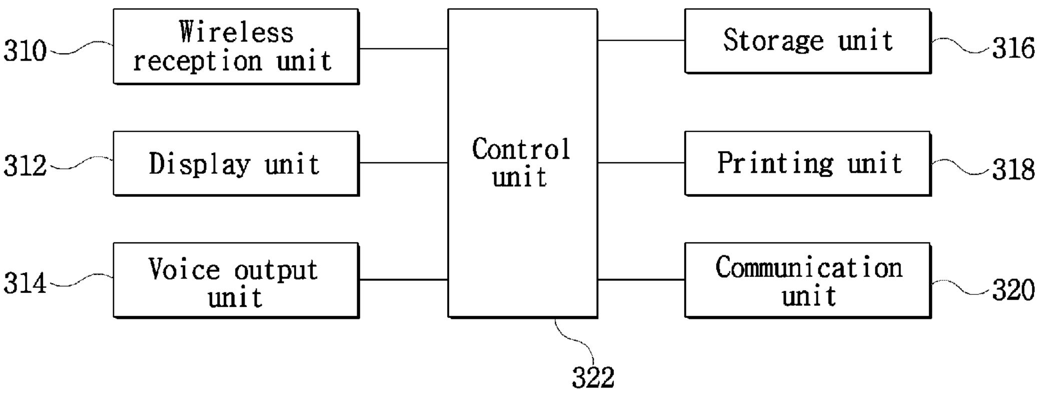
FIG. 2 is a block diagram of the internal configuration of an ATM main body shown in FIG. 1 according to an embodiment of the present invention.

FIG. 2 is a block diagram of the internal configuration of an ATM main body shown in FIG. 1 according to an embodiment of the present invention.

Generally, an ATM has a key input unit (not shown), a bankbook/card recognition unit (not shown) and a check/cash deposit/withdrawal unit (not shown). Here, the key input unit has a plurality of keys for performing a basic input for transaction to convert customer's input information into an electrical signal and to transmit the converted signal to a control unit. The bankbook/card recognition unit recognizes a bankbook or card inserted into the ATM, and the check/cash deposit/withdrawal unit performs the deposit/withdrawal of check and cash.

In this embodiment, a wireless reception unit 310 receives a signal transmitted from the remote controller through the local area wireless reception device, converts the received signal into a digital signal, and then transmits the converted digital signal to a control unit 322.

In a customer use mode as an ordinary state, a display unit 312 displays a customer's transaction or the like. In a system operation mode available for the remote controller, the display unit 312 displays a system control menu screen on which various system controls can be performed, a progress statement according to the opening and closing operation, failure information and failure correction processes, an update execution statement, and the like.

In the customer use mode as the ordinary state, a voice output unit 314 outputs, in a voice, various announcements according to a customer's transaction. In the system operation mode available for the remote controller, the voice output unit 314 outputs corresponding announcements so that various system controls can be performed only by the remote controller within a short distance without watching the display unit 312.

A storage unit 316 stores a system control program including a program for automatically performing the opening and closing operation of the ATM. In the operation/closing operation, a printing unit 318 outputs an opening/closing state portfolio. In the customer use mode, the printing unit 318 prints a customer's transaction in a customer's bankbook, and prints a customer's transaction portfolio.

A communication unit 320 performs an information exchange with a host computer in a bank under the control of the control unit 322. When an emergency call function is requested through the remote controller, the control unit 322 reads the previously stored telephone number of a corresponding institution or security agency, or extracts an internet protocol (IP) of the corresponding institution or security agency. Then, the communication unit 320 transmits an emergency signal to the corresponding institution or security agency through the extracted telephone number or IP. The communication unit 320 performs communication with an external device using a dedicated network, internet network or wireless communication network.

The control unit 322 performs a corresponding service in response to a signal requested through the wireless reception unit 310. For example, when the user requests the system operation mode through the remote controller, the control unit 322 calls the system control program stored in the storage unit 316 and displays a system control menu screen in the display unit 312, thereby providing and executing a system control menu required by the user. When the user requests the reboot of the ATM, the control unit 322 reboots the ATM by controlling the power of the ATM. In the opening/closing operation, the control unit 322 automatically performs the opening/closing processing and automatically opens/closes the door unit provided in the ATM at the same time. In the request of the emergency call, the control unit 322 reads the previously stored telephone number of the corresponding institution or security agency, or extracts the IP thereof.

Thus, through the ATM controlled by the remote controller according to the present invention, the user can automatically perform the opening and closing operation processes, which has been manually performed one by one, by pressing a button of the remote controller once, so that a person, such as a convenience store owner, who is not a specialist of the ATM, can quickly and simply perform the opening and closing operation of the ATM. Hereinafter, the processes of automatically performing the opening and closing operation using the ATM controlled by the remote controller according to the present invention will be described in detail with reference to FIGS. 3 and 4.

Figure 3:
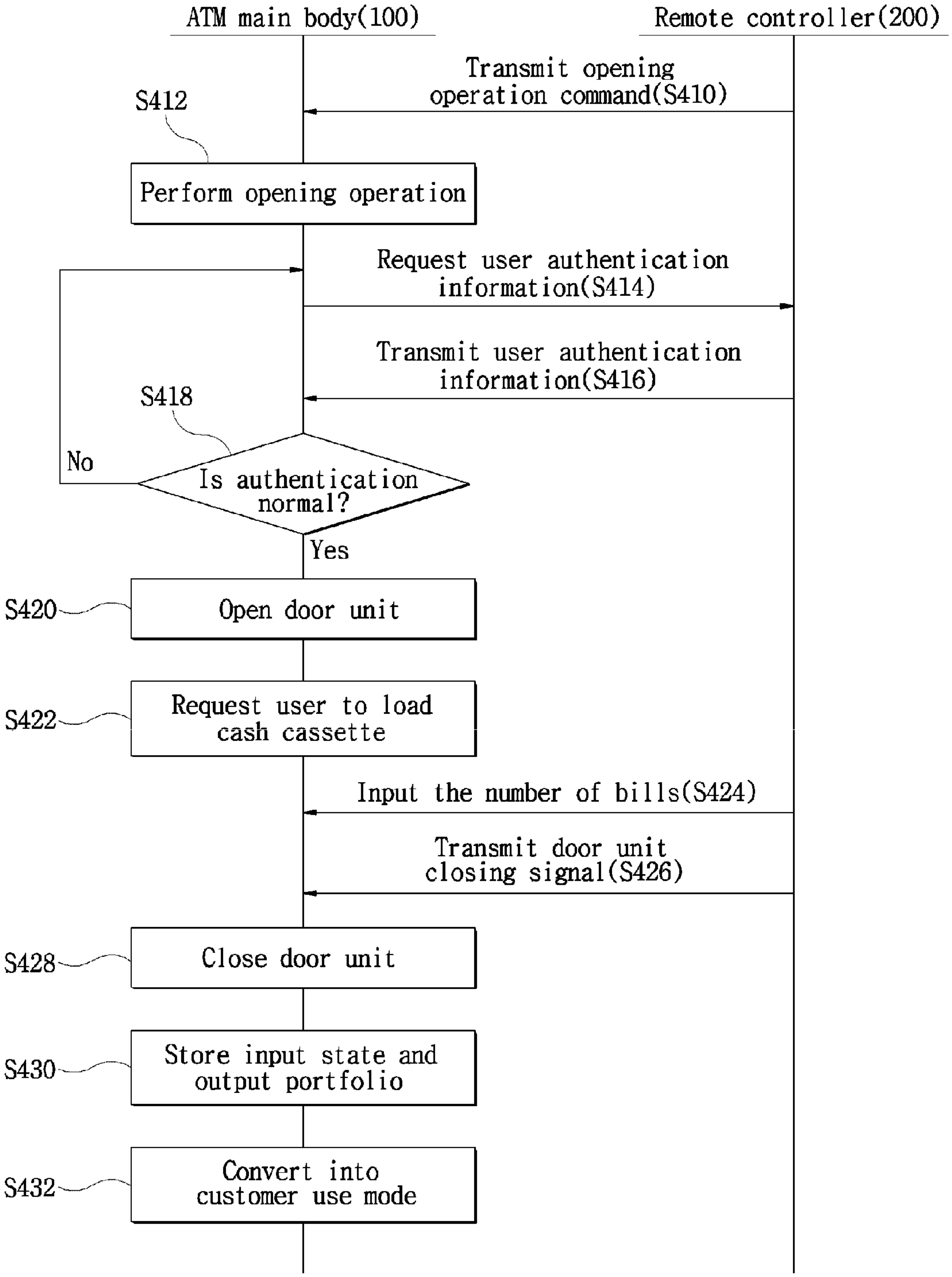
FIG. 3 is a flowchart illustrating a process of automatically performing the opening operation through the ATM controlled by the remote controller according to an embodiment of the present invention.

FIG. 3 is a flowchart illustrating a process of automatically performing the opening operation through the ATM controlled by the remote controller according to an embodiment of the present invention.

First, if a user transmits a command for performing the opening operation of the ATM using the remote controller (S410), the control unit of the ATM main body operates the ATM by controlling power of the ATM (S412). At this time, the control unit of the ATM main body requests the user to input a password or user's biological information for user authentication (S414). If the password or user's biological information is transmitted through the remote controller (S416), the control unit performs a user authentication process (S418) according to the password or user's biological information, thereby maintaining the security in the operation of the ATM.

If the user authentication process is normally completed, the control unit calls an opening operation program stored in the storage unit and automatically performs the opening operation without a separate input process performed by the user. According to the aforementioned process, the control unit automatically opens the door unit (S420) and outputs an announcement for requesting the user to mount a cash cassette in a withdrawal module through an announcement display unit or the voice output unit (S422).

Subsequently, the user mounts the cash cassette in the withdrawal module and then inputs the number of bills (S424). If the user transmits a door unit closing signal through the remote controller (S426), the control unit closes the door unit (S428) and completes the opening operation by outputting a portfolio while storing an input state in the storage unit (S430). Thereafter, the control unit converts the system operation mode into a customer user mode so that customers can receive banking services (S432).

Figure 4:
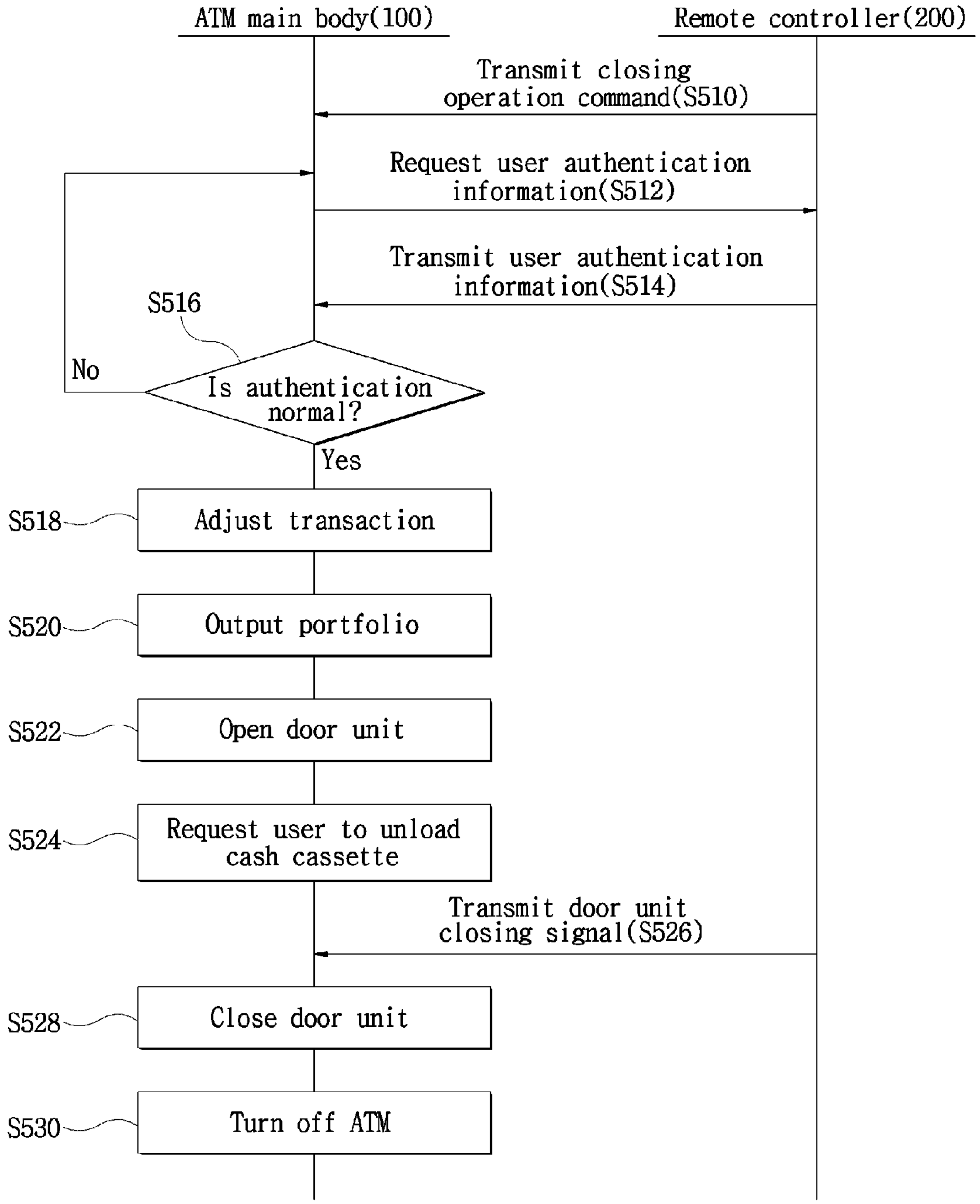
FIG. 4 is a flowchart illustrating a process of automatically performing the closing operation through the ATM controlled by the remote controller according to an embodiment of the present invention.

FIG. 4 is a flowchart illustrating a process of automatically performing the closing operation through the ATM controlled by the remote controller according to an embodiment of the present invention.

First, if a user transmits a command for performing the closing operation of the ATM using the remote controller (S510), the control unit of the ATM main body requests the user to input a password or user's biological information for user authentication (S512). If the password or user's biological information is transmitted through the remote controller (S514), the control unit performs a user authentication process (S516) according to the password or user's biological information, thereby maintaining the security in the operation of the ATM.

If the user authentication process is normally completed, the control unit calls a closing operation program stored in the storage unit and automatically performs the closing operation without a separate input process performed by the user. According to the aforementioned process, the control unit adjusts transactions (S518) and outputs a portfolio according to the transactions (S520). Thereafter, the control unit opens the door unit (S522) and outputs an announcement for requesting the user to unload the cash cassette from the withdrawal module to the announcement display unit or voice output unit (S524).

Subsequently, if the user unloads the cash cassette from the withdrawal module and then transmits a door unit closing signal to the ATM through the remote controller (S526), the control unit closes the door unit (S528) and terminates the ATM by turning off the power of the ATM (S530).

Thus, through the ATM controlled by the remote controller according to the present invention, the user can automatically perform the opening/closing operation process by pressing a button of the remote controller, without a process of manually opening a door unit using a safe key, operating the conventional ATM through the operation of a power button positioned within the conventional ATM, and pressing buttons while waiting in front of the conventional ATM, so that it is possible to quickly and simply perform the opening and closing operation of the ATM.

Although it has been described in the embodiments of the present invention that the system control program controlled by the remote controller is previously stored in the ATM main body when the release of the ATM to perform the opening/closing operation process in response to a command signal transmitted from the remote controller, the present invention is not limited thereto. That is, the system control program may be installed later in the ATM main body through a portable storage device including USB so as to perform the opening/closing operation process. Alternatively, the system control program may be transmitted from a banking server connected to a communication module built in the ATM main body through a command transmitted by the remote controller and then installed in the ATM main body.

The system control program includes various system control service programs for performing not only the opening and closing operation but also simple failure correction and automatic update of the ATM. Thus, when a user selects a desired system control menu, a corresponding system control program is automatically executed, so that simple failure correction and update operation can be easily performed from the outside without opening/closing the door unit of the ATM.

The present invention described above is not defined by the aforementioned embodiments and the accompanying drawings. Further, it will be understood by those skilled in the art that various replacements, changes and modifications can be made thereto without departing from the technical spirit and scope of the present invention.

INDUSTRIAL APPLICABILITY

The ATM controlled by a remote controller and an opening/closing operation method of an ATM using the remote controller according to the present invention can be used to provide improved banking services to customers by being applied when a failure of ATMs installed at various places occurs.

The invention claimed is:

1. An automated teller machine (ATM) controlled by a remote controller, comprising:

an ATM main body having a local area wireless reception device mounted therein; and a remote controller having a plurality of buttons provided therein to perform local area wireless communication with the ATM main body, wherein opening/closing operation of the ATM is automatically performed through button operation of the remote controller by executing a system control program stored in the ATM main body through the remote controller, wherein when a specific button of the remote controller is pressed for a certain period of time or more, the remote controller is connected to a previously specified telephone number or internet protocol (IP) through the ATM main body to perform an emergency call for informing outside of an emergency situation.

2. The ATM according to claim 1, wherein the remote controller comprises:

a wireless transmission unit for performing the local area wireless communication with the ATM main body;

a button operation unit having the plurality of buttons provided therein to convert user's input information into an electrical signal; and a central processing unit for transmitting the user's input information received through the button operation unit to the ATM main body through the wireless transmission unit.

3. The ATM according to claim 2, wherein the button operation unit comprises:

an opening/closing operation unit for automatically performing the opening/closing operation;

a menu operation unit for calling a system control menu screen;

a direction operation unit for selecting a system control menu; and a number operation unit for inputting a number key.

4. The ATM according to claim 2, wherein a user biological information recognition unit is additionally provided in the remote controller.

5. The ATM according to claim 1, wherein the ATM main body comprises:

a wireless reception unit for receiving a local area wireless signal through the local area wireless reception device and converting a received signal into a digital signal;

a display unit for displaying a system control menu screen and progress statement;

a voice output unit for outputting an announcement according to a system control;

a storage unit for storing a system control program including a program for automatically performing the opening/closing operation;

a printing unit for outputting a portfolio;

a communication unit for performing an information exchange with a host computer in a bank; and a control unit for performing a corresponding service in response to a signal received through the wireless reception unit.

6. The ATM according to claim 1, wherein the local area wireless communication between the ATM main body and the remote controller is performed using one of Zig-Bee, infrared communication, Bluetooth and radio frequency (RF).

7. A method of performing opening operation of an ATM by controlling the ATM main body using a remote controller available for local area wireless communication, the method comprising the steps of:

transmitting, by a user, an opening operation command to the ATM through the remote controller;

turning on, by a control unit of the ATM, the ATM main body according to the received opening operation command, and requesting a user of authentication information;

receiving authentication information transmitted through the remote controller;

performing user authentication for the received authentication information;

automatically opening a door unit to request the user to load a cash cassette when the user authentication is normally performed;

requesting the user to input the number of bills in the loaded cash cassette if the cash cassette is loaded;

closing the door unit if the number of bills is inputted; and storing the input information in a storage unit and outputting a portfolio; and connecting by the remote controller to a previously specified telephone number or internet protocol (IP) through the ATM main body to perform an emergency call for informing outside of an emergency situation when a specific button of the remote controller is pressed for a certain period of time or more.

8. The method according to claim 7, wherein the local area wireless communication between the ATM main body and the remote controller is performed using one of Zig-Bee, infrared communication, Bluetooth and RF.

9. The method according to claim 7, wherein the authentication information is a password or user's biological information.

10. A method of performing closing operation of an ATM by controlling the ATM main body using a remote controller available for local area wireless communication, the method comprising the steps of:

transmitting, by a user, a closing operation command to the ATM through the remote controller;

requesting the user of authentication information according to the received closing operation command;

receiving the authentication information transmitted through the remote controller;

performing user authentication for the received authentication information;

automatically opening a door unit to request the user to unload a cash cassette when the user authentication is normally performed;

closing the door unit if the cash cassette is unloaded; and terminating the ATM main body by turning off the power of the ATM main body; and connecting by the remote controller to a previously specified telephone number or internet protocol (IP) through the ATM main body to perform an emergency call for informing outside of an emergency situation when a specific button of the remote controller is pressed for a certain period of time or more.

11. The method according to claim 10, wherein the local area wireless communication between the ATM main body and the remote controller is performed using one of Zig-Bee, infrared communication, Bluetooth and RF.

12. The method according to claim 10, wherein the authentication information is a password or user's biological information.

* * * * *